United States Patent [19]
Silari et al.

[11] Patent Number: 5,149,966
[45] Date of Patent: Sep. 22, 1992

[54] APPARATUS AND METHOD FOR THE ABSOLUTE DETERMINATION OF THE ENERGY OF A ION BEAM

[75] Inventors: Marco Silari, Milan; Claudio Birattari, Bresso, both of Italy

[73] Assignee: Consiglio Nazionale Delle Ricerche, Rome, Italy

[21] Appl. No.: 682,963

[22] Filed: Apr. 10, 1991

[30] Foreign Application Priority Data

Apr. 11, 1990 [IT] Italy ............................ 19986

[51] Int. Cl.⁵ ........................... H01J 37/00
[52] U.S. Cl. ......................... 250/309; 250/305; 250/307
[58] Field of Search ............ 250/305, 307, 309, 306

[56] References Cited

U.S. PATENT DOCUMENTS 3,920.989 11/1975 Erickson et al. .............. 250/307
4,194,115 3/1980 Whitehead et al. ............ 250/307

Primary Examiner—Bruce C. Anderson
Attorney, Agent, or Firm—Oliff & Berridge

[57] ABSTRACT

The apparatus and method according to the invention allow for the determination of the energy of a ion beam, by directing the beam against a target of a suitable material, which causes elastic and inelastic scattering of the particles, so as to determine the crossover angle for which the energy of the elastically scattered particles equals that of the inelastically scattered ones, and to calculate, from this angle and from data relating to preselected physical values of the same particle beam, through preselected relativistic kinematic relationships, the energy of the incident beam, with an uncertainty lower than the energy dispersion of the beam.

12 Claims, 6 Drawing Sheets

APPARATUS AND METHOD FOR THE ABSOLUTE DETERMINATION OF THE ENERGY OF A ION BEAM

BACKGROUND OF THE INVENTION

1. Field of the Invention

The present refers to an apparatus and method for determining the kinetic energy of a ion beam, particularly of light weight ions, such as protons, deuterons, alpha particles, $^3$He ions, with an uncertainty lower than the energetic dispersion of the beam.

2. Description of Related Art

Understanding of energy and energy dispersion of a particle beam, such as the ions extracted from a cyclotron, or particle accelerator, is of great importance in a number of applications.

A typical case is represented, for instance, by the collection of nuclear data, which are of interest not only in the field of basic nuclear physics, but also in many fields of applied research, such as the production of highly pure radionuclides.

In fact, cyclotrons of low and medium energy are being produced commercially, which are intended mainly for use in applied research (biomedicine, materials science, ultimate analysis, etc.).

The information on the beam energy, which can be inferred from accelerator parameters supplied by the producer, is insufficiently precise in certain cases, such as the ones cited above, in which the cyclotron must be calibrated by a method sufficient to allow an absolute energy determination.

In fact, the uncertainty in the measurement must be lower than the energy dispersion of the beam. It would, furthermore, be desirable to have a sufficiently simple calibration method to easily carry out the periodical reproducibility tests on the cyclotron parameters.

SUMMARY OF THE INVENTION

An object of the present invention is to disclose a simple and reliable apparatus and method for the absolute determination of the energy of a ion beam.

Another object of the invention is provision of an apparatus and method which can be rapidly set up to provide the requested information in a few hours.

A further object of the invention is provision of an apparatus and method which will allow the calibration of beams emitted in particle and energy fields typical of presently available cyclotrons.

The physical process on which the proposed apparatus and method are based is known as "crossover technique".

This method utilizes relativistic kinematics relationships which describe an elastic and inelastic scattering process of nuclear particles by a suitable target.

When a beam of charged particles of mass Mp and kinematic energy $E_i$ strikes a suitable target consisting of two (or more) nuclear species, the particles undergo a series of elastic and inelastic scattering processes in competition with each other.

If two different nuclear species are present as the target, the particles scattered elastically by one of the target nuclei and inelastically by the other target nuclei have, in general, energies which differ for a generic angle $\theta$.

However, a specific value of the scattering angle exists, called crossover angle ($\theta c$), in which the particles diffused by the two processes have the same energy.

The determination of $\theta c$, through the process of kinematics while taking into account the relativistic corrections, allows one to unequivocally establish the energy $E_i$ of the ion beam incident on the target.

Assuming that the particles of the incident beam are scattered elastically by a light weight nucleus of mass $M_1$, and inelastically by a heavy weight nucleus of mass $M_2$, with $E_x$ as the excitation energy, the relationship between $\theta c$ and the kinetic energy T may be expressed by a fourth degree polynomial:

$$a_0T^4 + a_1T^3 + a_2T^2 + a_3T + a_4 = 0 \tag{a}$$

where:

$a_0 = 4 \sin^2\theta c$ $a_1 = 8\xi \sin^2\theta c$ $a_2 = 4[(\xi^2 - 2n) \sin^2\theta_c + k]$, $a_3 = 4\xi(K - 2n \sin^2\theta_c)$.

$a_4 = k^2 + 4n(n-k)$ $\xi = 2M_p - E_r;\ n = E_r M_p;\ k = E_r^2 - P_r^2$

Pr is the moment transferred at the crossover and is given by:

$$P_r^2 = \frac{E_x(M_2 - M_1 + E_x/2)[2M_1M_2 + E_x(M_1 + M_2 + E_x/2)]}{(M_2 - M_1)^2} \tag{b}$$

$E_r$ is the energy transferred at the crossover and is given by:

$$E_r = (M_1^2 + P_r^2)^{\frac{1}{2}} - M_1 = [(M_2 + E_x)^2 + P_r^2]^{\frac{1}{2}} - M_2 \tag{c}$$

where the masses are expressed in energy units.

The fourth degree polynomial (a) has two actual resolutions: one gives the sought for $E_i$ value; the other gives the value $E_r$, which is constant with $\theta$.

The accuracy of the determination of the $E_i$ value is solely a function of the precision with which angle $\theta c$ is measured.

In fact, the imprecision with which $M_p$, $M_1$, $M_2$, $E_x$ are known is practically negligible.

In view of the desired results, an apparatus was developed for determining the kinetic energy $E_i$ of a ion beam, particularly of light weight ions, comprising a vacuum scattering chamber and elaboration means, said chamber consisting of a fixed section and a mobile one, pivotable with respect to the fixed one, the chambers being connected with each other and vacuum proof, wherein the fixed section is operatively connectable with a beam of incident particles and includes a target, consisting of a thin sheet, in the range of a few μm thick, of a suitable material consisting of atoms with light nuclei and atoms with heavy nuclei prone to elastically and inelastically scatter said particles, and wherein the mobile section comprises means for detecting charged particles and means for transducing the signals supplied by said detector means into electrical signals indicative of the energy possessed by the particles elastically and inelastically scattered by said target, either for preselected angular positions of the mobile section with respect to the fixed one, or diffusion angles $\theta$. The fixed section is joined to a plate having a preselected graduated scale, while said mobile section is fastenable to said plate by micrometric regulation means which regulate its angular position with respect to the fixed section. The elaborating means is programmed for receiving data relating to preselected physical values of said particle beam, preselected angular positions of said mobile section with respect to the fixed section, the relative values of the energy possessed by the elastically scattered particles and of the energy possessed by the inelastically scattered particles by said target, to derive from these data the angular crossover position (crossover angle $\theta c$) in which the energy of the elastically scattered particles equals that of the inelastically scattered ones, and, through preselected relativistic kinematics relations, the value of the kinetic energy $E_i$ possessed by the incident particle beam.

The method according to the invention comprises the steps of:

introducing an incident particle beam into an evacuated scattering chamber consisting of a fixed section comprising a target, consisting of a thin sheet, in the range of a few $\mu$m thick, of a suitable material consisting of molecules formed by atoms with light weight nuclei and with heavy nuclei, prone to elastically and inelastically scatter said particles, and of a mobile section pivotable with respect to said fixed section, which can be connected to a plate joined with said fixed section, having a preselected graduated scale, by micrometric regulation means which regulate its angular position with respect to the fixed section, the mobile section comprising means for detecting charged particles and means for transducing the signals supplied by said detector means into signals indicating the energy possessed by the particles elastically and inelastically scattered by said target, directing said particle beam into said scattering chamber to make it incident upon said target;

detecting the values of the energy possessed by the particles elastically and inelastically scattered by said target, for pre-established angular inclination positions of said mobile section with respect to the fixed section, or scattering angles $\theta$;

feeding into programmed computers the data relating to preselected physical values of said particle beam and of the data relating to said preselected angular inclination positions and of said detected values of the energy possessed by the particles elastically and inelastically scattered by said target;

deriving from said data the angular crossover position (crossover angle $\theta c$), for which the energy of the elastically scattered particles equals that of the inelastically scattered ones, and, through preselected relativistic kinematics relationships, the kinetic energy $E_i$ possessed by the incident particles beam.

BRIEF DESCRIPTION OF THE DRAWINGS

Characteristics and advantages of the invention will now be illustrated with reference to FIGS. 1–6 attached, in which a preferred embodiment of the invention is represented as a non-limiting example.

DETAILED DESCRIPTION OF THE PREFERRED EMBODIMENT

Figure 1:
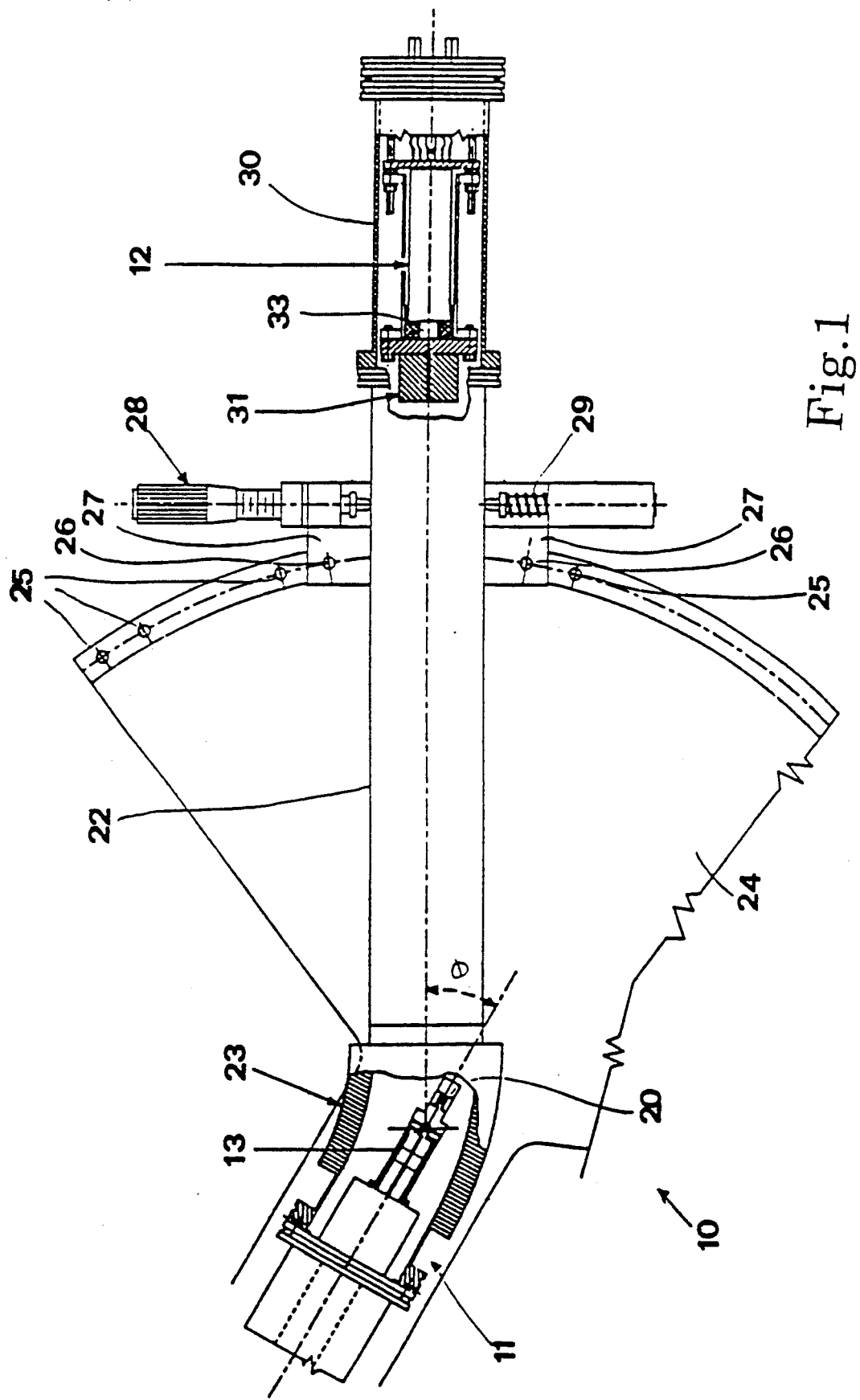
FIG. 1 is a schematic, partially in section, representation of an apparatus according to the invention.

FIG. 1 shows a scattering vacuum chamber 10 according to the invention, the chamber consisting of a fixed section 11 and a mobile section 12, pivotable with respect to the fixed section 11.

Not shown is the ion beam line, particularly light weight ions, such as protons, deuterons, $^3$He ions, and alpha particles coming from a cyclotron (also not shown), which is joined and coaxial with the fixed section 11.

Figure 2:
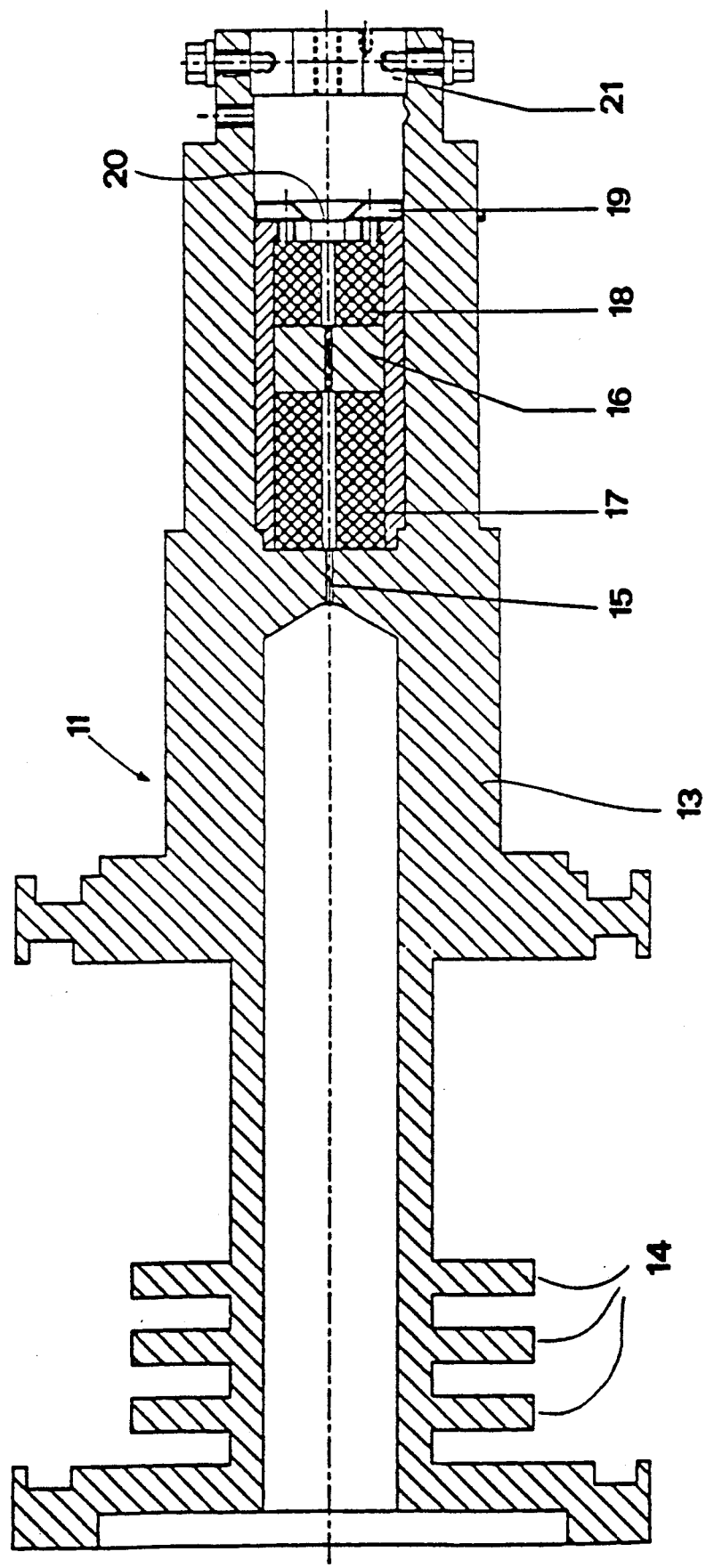
FIG. 2 is a view in longitudinal section, in an enlarged scale, of a detail of the apparatus of FIG. 1.

Section 11 shows, as can be seen in FIG. 2, an aluminum insert 13, with fins 14 which allow for its air cooling; the insert 13 contains a collimator 15, 16, the size of which is a function of the precision required, and lead shielding 17, 18, to protect against the radiation generated in the collimator due to the interaction with the incident primary beam ions.

Insert 13 also contains a support 19 for target 20, placing it at the rotation center of movable section 12, and a beam suppressor 21 which is electrically, but not thermally, insulated from the rest of the chamber, and which can be connected with a current gauge (not shown) to control the ion beam current incident on the target. Target 20 consists of a very thin foil, in the range of a few $\mu$m, of a suitable material, such as Mylar. The suitable material is made up of molecules containing hydrogen, carbon and oxygen; or polyethylene, consisting of hydrogen and carbon molecules, thereby ensuring its makeup contains light weight nuclei (hydrogen) and heavy nuclei (carbon).

A cylindrical arm 22 of the mobile section 12 is connected with fixed section 11 and insert 13 by means of multilamellar, vacuum tight bellows 23. Fixed section 11 is joined with a semicircular plate 24, provided with calibrated holes 25, with a 5 degree interaxis, which correspond to calibrated holes 26 on a plate 27 joined with cylindrical arm 22.

The angular excursion of arm 22 extends from $-55°$ to $+55°$ with respect to the 0° position and its rough positioning with respect to plate 24 is made by means of plugs (not shown) inserted into calibrated holes 25 and 26.

A micrometria regulation device 28 held by spring 29, allows the precise positioning of arm 22, within the 5° interval existing between calibrated holes 25.

Figure 3:
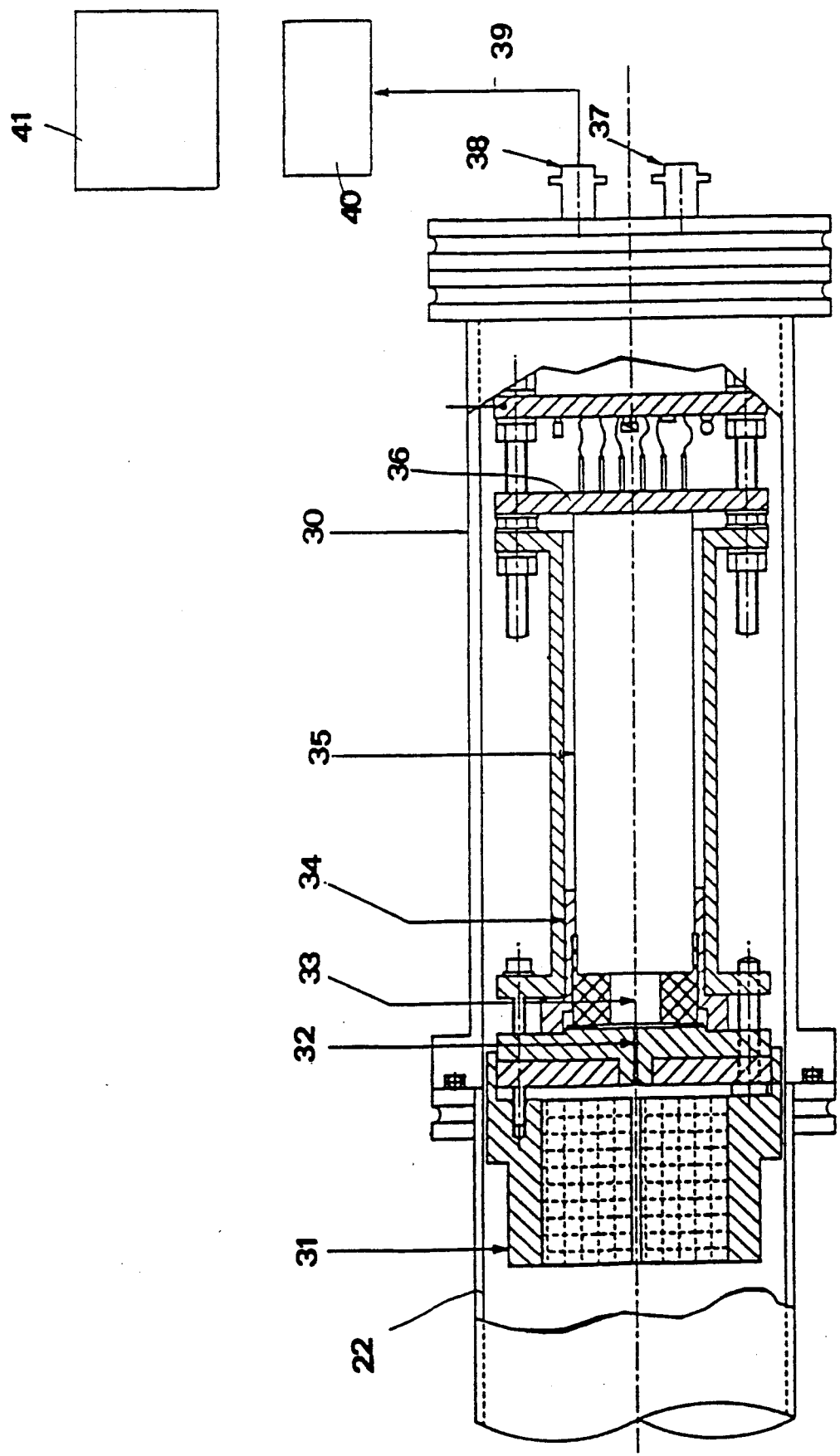
FIG. 3 is a view in longitudinal section, in an enlarged scale, of another detail of the apparatus of FIG. 1.

As shown in FIG. 3, inside shell 30, connected by a flange to arm 22 are located a lead shield 31, an aluminum collimator 32, and a charged particle detector 33, which is supported by a centering ring 34; in this particular case the detector 33 is of the scintillation type and is coupled with photomultiplier 35.

A voltage divider 36 is connected to photomultiplier 35 and to the two vacuum connectors 37, 38, one for electrical feed and the other for exit of the signals emitted by detector 33.

Connector 38 may be operatively linked through line 39 to an acquisition system consisting of a preamplifier, an amplifier and a multichannel analyzer (MCA) schematically represented by 40.

The data supplied by acquisition system 40 are elaborated by computer programs to a programmed computer 41, e.g., a personal computer, as it will be later described.

The beam of light ions, such as protons, deuterons, $^3$He ions, alpha particles, coming from a cyclotron, enters fixed section 11 striking target 20, from which they are scattered, elastically by the light weight hydrogen nuclei and inelastically by the heavy carbon nuclei; the energy possessed by the elastically and inelastically scattered ions is detected by detector 33, for selected angular positions of mobile section 12 with respect to fixed section 11, or scattering angles $\theta$ (e.g., some angles to the right and some to the left of position 0°) to correct the unavoidable system asymmetry, and is visualized by system analyzer 40. Each operation for the acquisition of values takes from a few hundred to about 2000 seconds.

The barycentric E ($\theta$) values of peaks in the spectra due to elastic and inelastic scatterings are detected with minimal errors, typically of one or two channels, which correspond to errors of a few tens of keV of the value of the incident beam energy $E_i$, which is on the order of tens of MeV.

Figure 4:
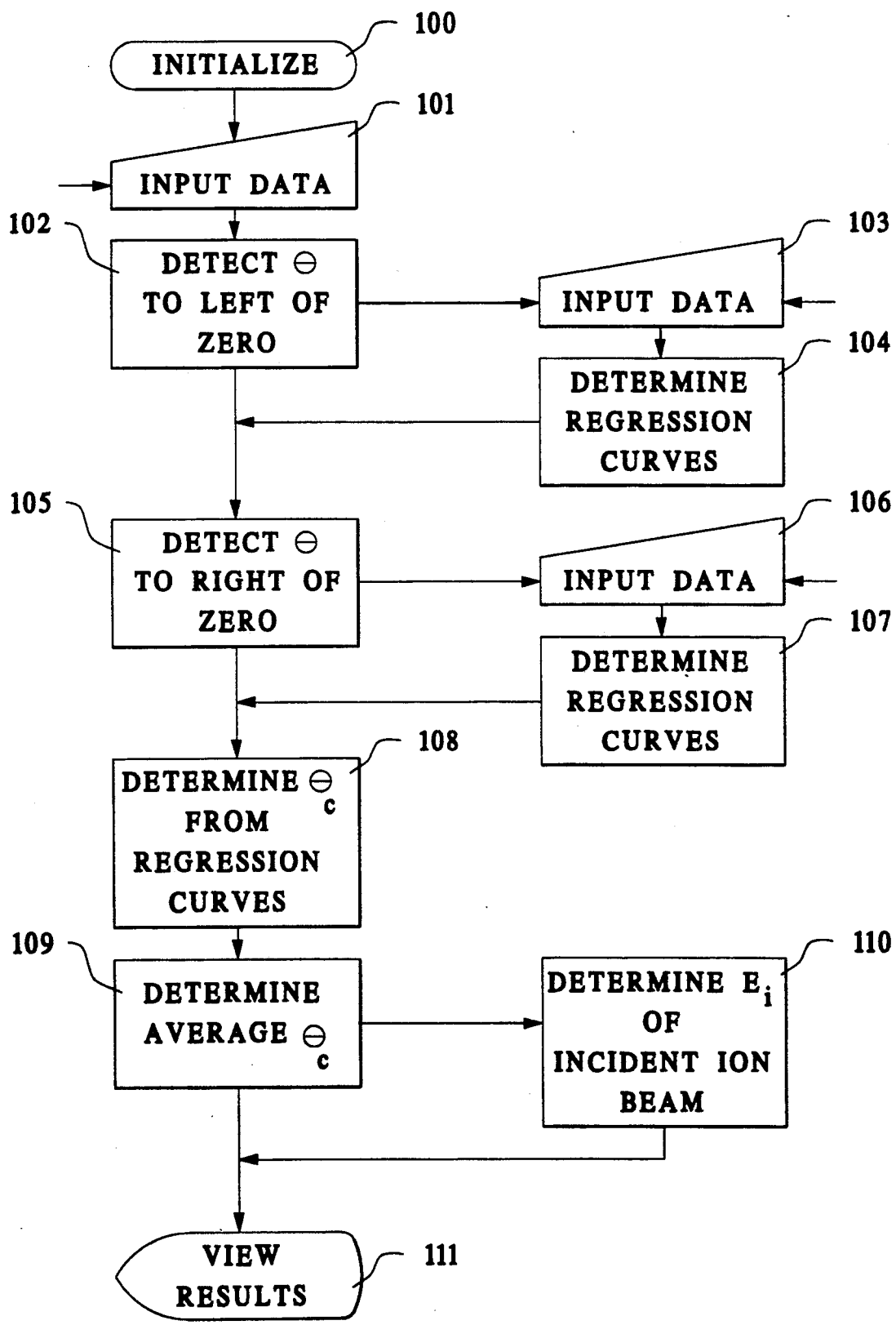
FIG. 4 shows a flow chart of the determination method implemented by the apparatus of FIG. 1.

In programmed computer 41, which holds the program schematically shown by the flow chart of FIG. 4, input data are introduced, such as: 1) the type of ion incident on the target, in order that the physical values of the incident beam, which are necessary for determining the solutions of the previously cited fourth degree polynomial may be defined; 2) the output data from the analyzer of system 40, acquired for selected scattering angles, that is; i) the same scattering angles or angular position of mobile section 12 with respect to fixed section 11, to the left and to the right of zero; ii) the barycentric values of the peaks of energy E ($\theta$) possessed by ions elastically scattered by hydrogen nuclei; iii) the barycentric values of the peaks of energy E ($\theta$) possessed by ions inelastically scattered by carbon nuclei; 3) an initial evaluation of the ion beam energy, which can be, for example, its nominal energy.

In FIG. 4, 100 schematizes the initialization; 101 the introduction of data 1) and 3) cited above; 102 the process of detecting the scattering angles to the left of zero; 103 the operations of introduction of data 2) i) ii), and 2) i) iii) corresponding to said scattering angles to the left; 104 the operations of determining by interpolation the regression curves representing, as a function of scattering angles $\theta$ to the left, the course of energy possessed by the elastically and inelastically scattered ions; 105 the operation of detecting scattering angles $\theta$ to the right of zero; 106 the introduction of data 2) i) ii) and 2) i) iii) corresponding to said scattering angles to the right; 107 the determination, by interpolation of regression curves which represent, as a function of scattering angles to the right, the course of the energy possessed by the elastically and inelastically scattered ions; 108 the determination of crossover angles $\theta_c$ from regression curves obtained in 104 and 107; 109 the determination of crossover angle $\theta_c$ as an average of the angles obtained in 108; 110 the determination of kinetic energy $E_i$ of the incident ion beam through resolution of the fourth degree polynomial (a) reported supra; 111 the visualization of results obtained in 109 and 110.

Computer 41 may also be fed calculation programs auxiliary to the one schematically shown in FIG. 4.

For instance, a program for determining the energy of ions scattered at a selected $\theta$ angle from target 20, starting from the incident beam energy, so as to allow the singling out, through the analyzer of system 40, of the peaks of spectra relating to the elastic and inelastic scattering of interest.

Figure 5:
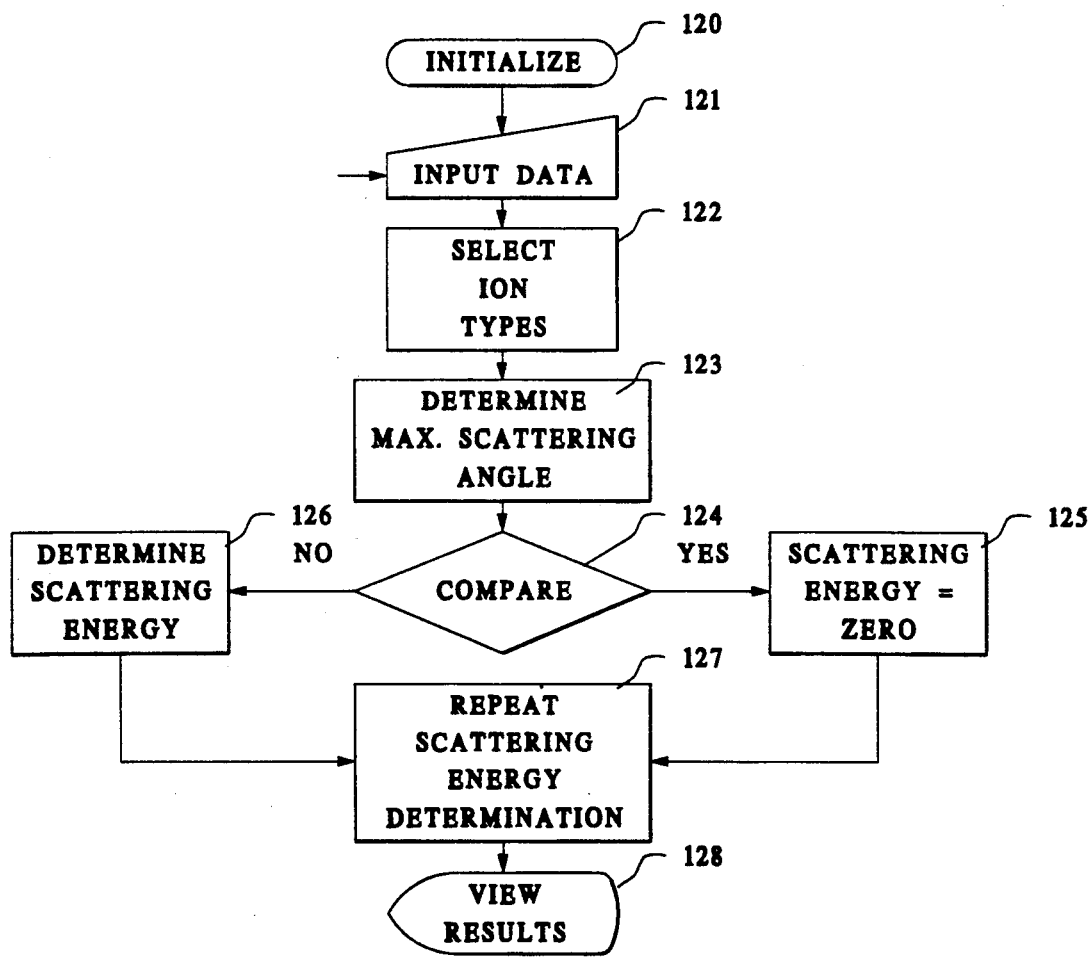
FIG. 5 shows a flow chart of a determination method auxiliary to the one of FIG. 4.

The flow chart of this program is represented in FIG. 5, in which 120 schematizes the initialization operation, 121 the introduction of data, that is, type of ion, incident beam energy, scattering angle; 122 the selection of the ion types; 123 the determination of the maximum scattering angle of light weight nuclei (hydrogen); 124 the operation for checking whether the introduced scattering angle is larger than the maximum one; in the affirmative, the scattering energy is made equal to zero at 125; in the negative, the energy possessed by the elastically scattered ions is determined at 126 after having determined the threshold energy for the inelastic scattering and having checked that the incident ion energy is larger than the threshold one; 127 schematizes the repeated operations for determining the energies of elastically and inelastically scattered ions; 128 the result visualization.

Figure 6:
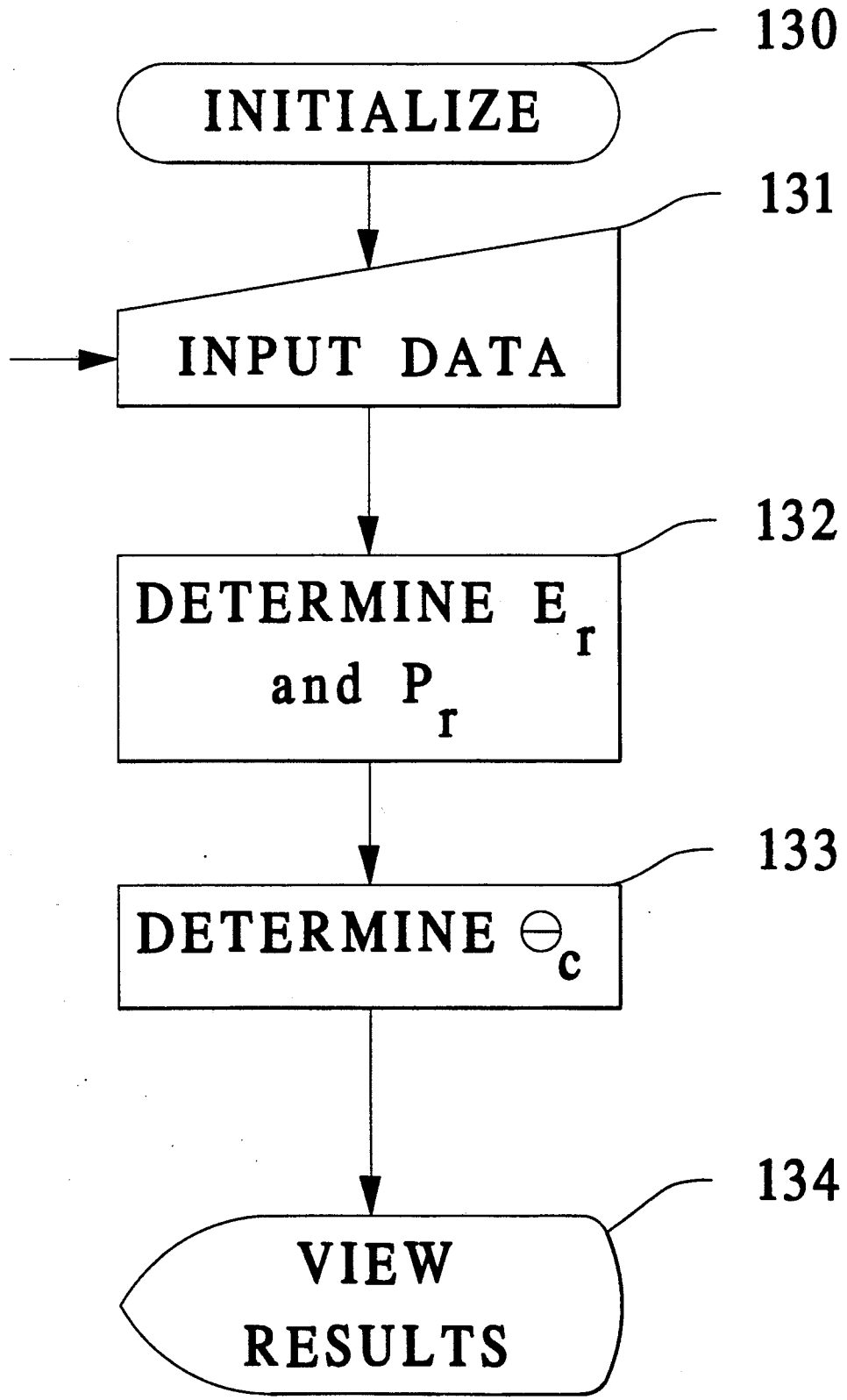
FIG. 6 shows a further flow chart of a determination method auxiliary to the one of FIG. 4.

A further auxiliary calculation program, the flow chart of which is represented in FIG. 6, serves to determine the crossover $\theta_c$ angle; after initialization 130, and introduction 131 of input data consisting of ion type, combination of target-nuclei and energy level of the heavy nucleus, and maximum energy of incident ion, the variables $E_r$ and $P_r$ are determined at equations b) and c), supra, 132 block, and from these the crossover angle $\theta_c$ 133 block, visualized in 134.

The suggested apparatus and method are particularly interesting because of the reliability and precision of the obtained results and the simplicity and relative rapidity of the operations required.

We claim:

1. Apparatus for determining the kinetic energy $E_i$ of a particle beam, such as ions, and particularly light weight ions, comprising a vacuum scattering chamber and computer means, said scattering chamber consisting of a fixed section and a mobile section pivotable with respect to the fixed one, the two sections being connected to each other and vacuum proof, wherein the fixed section is operatively connectable to a line of an incident particle beam and comprises a target, consisting of a sheet, with a thickness of a few $\mu$m, of a suitable material formed of molecules consisting of atoms with light weight nuclei, and atoms with heavy nuclei, suitable to elastically and inelastically scatter said particles, and wherein the mobile section comprises means for detecting charged particles and means for transducing the signals supplied by said detector means into electrical signal indicative of the energy possessed by particles elastically and inelastically scattered by said target for preselected angular positions of the mobile section with respect to the fixed one, or scattering angles $\theta$, said fixed section being joined to a plate provided with a graduated scale, said mobile section being fastenable to said plate by micrometric registration means which regulate its angular position with respect to the fixed section, said computer means for determining the kinetic energy $E_i$ of said incident particle beam being programmed for receiving data relating to selected physical values of said particle beam and data relating to said selected angular positions of said mobile section with respect to the fixed one and to the relative values of the energy possessed by the elastically scattered particles and the energy possessed by the inelastically scattered ones from said target, to derive from said data a crossover angle ($\theta_c$) in which the energy possessed by the elastically scattered particles equals that possessed by the inelastically scattered particles, and with the aid of selected relativistic kinematics relationships, the value of the kinetic energy $E_i$ possessed by the incident particle beam.

2. Apparatus according to claim 1, wherein said fixed section further comprises collimation means for said particle beam, suitable shielding means for attenuating the background radiation, supporting means for said target capable of placing it in the rotation center of said mobile section, means for suppressing the particle beam, and said mobile section further comprising respective shielding means.

3. Apparatus according to claim 1, wherein said sections, fixed and mobile, are connected to each other through multilinear, vacuum proof bellows.

4. Apparatus according to claim 1, wherein said computer means is programmed to receive as input data:
1) the type of particles incident on target so that the physical values of the incident beam necessary for determining the solutions of said relativistic kinematics relationships may be defined; 2) the data acquired in said detection operations for the selected diffraction angles, that is i) the same scattering angles or angular positions of said mobile section unit with respect to said fixed section on the right and on the left of the zero position; (i) the barycentric values of the peaks of energy F (A) possessed by the particles elastically scattered by the light weight nuclei; iii) the barycentric values of the peaks of energy E ($\theta$) possessed by the particles inelastically scattered by the heavy nuclei;
3) an initial evaluation of the value of the energy of the particle beam, which may be, for example, its nominal energy.

5. Apparatus according to claim 1, wherein said target consists of a very thin sheet, a few $\mu$m thick, of a suitable material, such as Mylar, or polyethylene.

6. Apparatus according to claim 1, wherein said computer means is programmed to obtain said kinetic energy value $E_i$ according to the following relationship:

$$a_0 T^4 + a_1 T^3 + a_2 T^2 + a_3 T + a_4 = 0$$

where $a_0 = 4 \sin 2\theta_c,$ $a_1 = 8\xi \sin^2 \theta_c,$ $a_2 = 4[(\xi^2 - 2n) \sin^2 \theta_c + k],$ $a_3 = 4\xi(K - 2n \sin^2 \theta_c),$ $a_4 = k^2 + 4n(n-k),$ and $\xi = 2M_p - E_r; n = E_r M_p; k = E_r^2 - P_r^2.$ 7. Method for determining the kinetic energy $E_i$ of a ion beam, and particularly of light weight ions, comprising the steps of:
introducing an incident particle beam into a scattering evacuated chamber consisting of a fixed section comprising a target consisting of a thin sheet, a few $\mu$m thick, of a suitable material consisting of molecules formed by atoms with light weight nuclei and atoms with heavy nuclei, suitable for the elastical and inelastical scattering of said particles, and of a mobile section pivotable with respect to said fixed section and which can be joined to a plate joined to said fixed section, provided with a selected graduated scale, with the aid of micrometric registration means which regulate its angular position with respect to said fixed section, comprising means for detecting charged particles and means for transducing signals supplied by said detector means into signals indicative of the energy possessed by the particles elastically and inelastically scattered by said target, directing said particle beam into said scattering chamber to cause their incidence on said target, detecting the values of the energy possessed by the particles elastically and inelastically scattered by said target, for pre-established inclination angular positions of said mobile section with respect to the fixed section, or scattering angles $\theta$, feeding into programmed computer means data relative to physical values of said particle beam and data relative to said selected inclination angular positions and said detected values of the energy possessed by the particles elastically scattered and inelastically scattered by said target, determining from said data the crossover angle $\theta_c$ for which the energy of the elastically scattered particles equals that of the inelastically scattered particles, and, by means of selected relativistic kinematics relationships, determining the kinetic energy $E_i$ possessed by the incident particle beam.

8. Method according to claim 7, wherein said feeding of said programmed computer means consists of introducing as input data:
(1) the type of particles incident on target, so as to make it possible to define the physical values of the incident beam, needed for determining the solutions of said relativistic kinematics relationships;
(2) the data acquired in said detection operations for the selected scattering angles, that is i) the same scattering angles or angular positions of said mobile section with respect to said fixed section, to the left and to the right of position zero; ii) the barycentric values of the peaks of energy E ($\theta$) possessed by the particles elastically scattered by the light weight nuclei; iii) the barycentric values of the peaks of energy E ($\theta$) possessed by the particles inelastically scattered by the heavy nuclei;
(3) an initial evaluation of the energy value of the particle beam, which may, for example, be its nominal value.

9. Method according to claim 8, further comprising the steps of:
initializing said computer means;
introducing said data 1) and 3);
detecting the scattering angles $\theta$ to the left of said zero position;
introducing data respectively 2) i) ii) and 2i) iii) corresponding to said scattering angles to the left;
determining, by interpolation, the regression curves representing, as a function of the scattering angles to the left, the course of the energy possessed by the elastically and inelastically scattered particles;
detecting the scattering angles $\theta$ to the left of aero;
introducing data 2) i) ii) and 2) iii) corresponding to said scattering angles to the right;

determining, by interpolation, the regression curves representing, as a function of the scattering angles to the right, the course of the energy possessed by the elastically and inelastically scattered particles;

determining the crossover angles $\theta_c$ from the regression curves obtained through said operations;

determining the crossover angle $\theta_c$ as an average value of the angles obtained through said operations;

determining the kinetic energy $E_i$ of the incident particle beam, through the solution of said selected relativistic kinematics relationships;

visualizing the results obtained by means of said operations.

10. Method according to claim 9, further comprising the steps of:

a further initializing operation;

introducing input data, that is particle type, incident beam energy, scattering angle $\theta$;

selecting a particle type;

determining the maximum scattering angle on light weight nuclei (hydrogen)

checking whether the introduced scattering angle is larger than the maximum one, and in the affirmative make scattering energy equal to zero, while in the negative, determine the energy possessed by the elastically scattered particles, after having determined the threshold energy for the inelastic scattering and determined that the incident particle energy is larger than the threshold one;

repeatedly determining the energy of the elastically and inelastically scattered particles;

visualizing the results obtained through said operations.

11. Method according to claim 9, further comprising the steps of:

a further initializing operation;

introducing input data consisting of: particle type, combination target nuclei and energy level of heavy nuclei, maximum energy of incident particles;

determining energy transferred at the crossover $E_r$ and moment transferred at the crossover $P_r$ according to the following relationships:

$$P_r^2 = \frac{E_x(M_2 - M_1 + E_x/2)[2M_1M_2 + E_x(M_1 + M_2 + E_x/2)]}{(M_2 - M_1)^2}$$

and $$E_r = (M_1^2 + P_r^2)^{\frac{1}{2}} - M_1 = [(M_2 + E_x)^2 + P_r^2]^{\frac{1}{2}} - M_2;$$

determining crossover angle $\theta_c$ from the variables obtained through said determination;

visualizing the results.

12. Method according to claim 7, wherein said operations are suitable for obtaining said $E_i$ kinetic energy value by the following equation:

$$a_0 T^4 + a_1 T^3 + a_2 T^2 + a_3 T + a_4 = 0$$

where $a_0 = 4\sin^2\theta_c$, $a_1 = 8\xi\sin^2\theta_c$, $a_2 = 4[(\xi^2 - 2n)\sin^2\theta_c + k]$, $a_3 = 4\xi(K - 2n \sin^2\theta_c)$, $a_4 = k^2 + 4n(n-k)$, and $\xi = 2M_p - E_r;\ n = E_r M_p;\ k = E_r^2 - P_r^2$.

* * * * *